US007711125B2

(12) United States Patent
Foster

(10) Patent No.: US 7,711,125 B2
(45) Date of Patent: May 4, 2010

(54) AUDIO DISTRIBUTION SYSTEM

(75) Inventor: Andrew Foster, Wigan (GB)

(73) Assignee: Computionics Limited (GB)

( * ) Notice: Subject to any disclaimer, the term of this patent is extended or adjusted under 35 U.S.C. 154(b) by 960 days.

(21) Appl. No.: 10/536,344

(22) PCT Filed: Nov. 27, 2003

(86) PCT No.: PCT/GB03/05181

§ 371 (c)(1),
(2), (4) Date: Nov. 7, 2005

(87) PCT Pub. No.: WO2004/049758

PCT Pub. Date: Jun. 10, 2004

(65) Prior Publication Data

US 2006/0153397 A1 Jul. 13, 2006

(30) Foreign Application Priority Data

Nov. 28, 2002 (GB) ................................ 0227698.8

(51) Int. Cl.
*H04B 3/00* (2006.01)
*H04B 1/00* (2006.01)

(52) U.S. Cl. ........................................ 381/77; 381/119

(58) Field of Classification Search ................... 381/77, 381/104, 119, 105, 85, 81, 82; 379/159, 379/171
See application file for complete search history.

(56) References Cited

U.S. PATENT DOCUMENTS

| | | | | | |
|---|---|---|---|---|---|
| 4,524,452 | A | * | 6/1985 | Marshak | 381/28 |
| 4,882,762 | A | * | 11/1989 | Waldhauer | 381/106 |
| 5,165,099 | A | * | 11/1992 | Onaya et al. | 381/1 |
| 5,666,428 | A | | 9/1997 | Carrin et al. | |
| 6,389,139 | B1 | | 5/2002 | Peterson, Jr. et al. | |
| 7,065,418 | B2 | * | 6/2006 | Standard et al. | 700/94 |

* cited by examiner

*Primary Examiner*—Vivian Chin
*Assistant Examiner*—George C Monikang
(74) *Attorney, Agent, or Firm*—Salter & Michaelson

(57) ABSTRACT

An audio distribution system comprises a plurality of individual signal conditioning circuits connected in series. Each circuit comprises a signal conditioning unit to which an audio input (13) is fed. The output from the unit is fed to a precision signal addition device. Each circuit also comprises a balanced line level input (11), which is fed to a balanced to unbalanced precision signal converter the output of which is connected to the precision signal addition device. The output from the precision signal addition device is fed to an unbalanced to balanced converter which provides at its output a balanced line level signal (12). As compared with a conventional distribution system, the system enables only one balanced line level input to amplification equipment eliminating any mixing or control means that equipment and obtaining the need for a conventional mixer.

10 Claims, 1 Drawing Sheet

AUDIO DISTRIBUTION SYSTEM

TECHNICAL FIELD

The present invention relates to an audio distribution system.

BACKGROUND OF THE INVENTION

An audio distribution system consists of a set of audio inputs connected in such a way as to either mix or route these inputs to a single output or set of outputs. There is always one output that may have a multiplicity of inputs which will be either selectable or mixed together to form the composite audio signal, which, after amplification, is fed to output device(s), usually loudspeakers.

The conventional way of combining and routing all these input signals is via a mixer, In the mixer, the audio inputs are combined at various selected levels using volume controls to give a composite output signal which may be fed to an amplifier for amplification and hence to output devices, for example, loudspeakers. Some common features of these mixers are:

Where many inputs are required the mixer needs to be able to handle and control many different inputs which may be in different signal formats, for example, from a microphone and from the stereo output of for example, a CD player.

Many different audio products have different audio output connections as standard. These connectors are not suited to a single 'mixer' which tends to have many audio inputs all with the same input connection system.

All of the audio inputs have to be cabled back to the same point, that is the composite mixer position.

In typical systems different inputs at different input levels are required for, for example background music (BGM) for a stereo output at 0 db (relative to 1vRMS-Line Level) requiring its own mixing, and a microphone input from an electret microphone at −60 db typically.

These conventional types of mixers are used in most audio applications where the audio inputs are all relatively near to each other and prove convenient. However, currently there is an increasing demand for systems to have many inputs spatially distributed around a building at different points with a requirement for many different audio connectors which are not compatible with conventional mixers. In these types of applications conventional mixing systems have several disadvantages:

There will be long cable runs to the mixer from some inputs from various points in a building. If these cables carry conventional unbalanced microphone level inputs then they will be very susceptible to electromagnetic pick up and interference characterized normally by 'mains hum'.

Quite often only one or two inputs are required and the mixers tend to be a least 6-way type units. This leads to many redundant and unnecessary inputs.

Different plug and connection systems employed now in the audio industry (both industrial and domestic) mean that virtually every conventional mixer will require at least some form of special lead to be manufactured from the input device to the mixer and in the case of a stereo signal will require that two inputs are used to mix the stereo signal. Even where the connection system is compatible, the cable from the audio device needs to be so long that it requires extending quite often in very expensive shielded cable.

Many audio sources are not of the so called 'balanced type', In this type of source there are two wires in which neither is grounded. The audio signal is defined as the difference between the signal levels on the two wires. Thus any common mode induced signal is eliminated when the signal is terminated by a suitable balanced to unbalanced converter. This means that if they are not of a high signal level they are susceptible to electromagnetic induction (EMI) causing interference with the wanted signal.

Clearly in situations where audio sources are to be sited spatially away from the central mixing equipment this situation is not ideal. It would be beneficial if the signal conditioning were to be effected nearer to the audio source together with the provision of a suitable connection system to suit the audio source.

SUMMARY OF THE INVENTION

According to the present invention there is provided an audio distribution system comprising a plurality of individual signal conditioning circuits connected in series each circuit comprising means for converting a balanced signal to an unbalanced signal, means for mixing the unbalanced signal with an audio signal to form a composite signal and means for rebalancing the composite signal to form a balanced signal.

In a preferred embodiment of the invention, the means for converting comprises a balanced to unbalanced precision converter. The means for mixing comprises a precision addition device. The precision addition device is connected to the output from the precision converter. Means are advantageously provided for conditioning the audio signal. The means for conditioning the audio signal are connected to the precision addition device. The means for rebalancing comprises an unbalanced to balanced precision converter. The means for rebalancing is connected at its input to the output from the means for mixing. The means for conditioning the audio signal comprises one or more audio controls such as tone, volume, on/off, attenuation or, spectral manipulation.

DESCRIPTION OF THE DRAWINGS

In order that the invention may be more clearly understood, one embodiment thereof will now be described by way of example, with reference to the accompanying drawings, in which.

DETAILED DESCRIPTION

Figure 1:
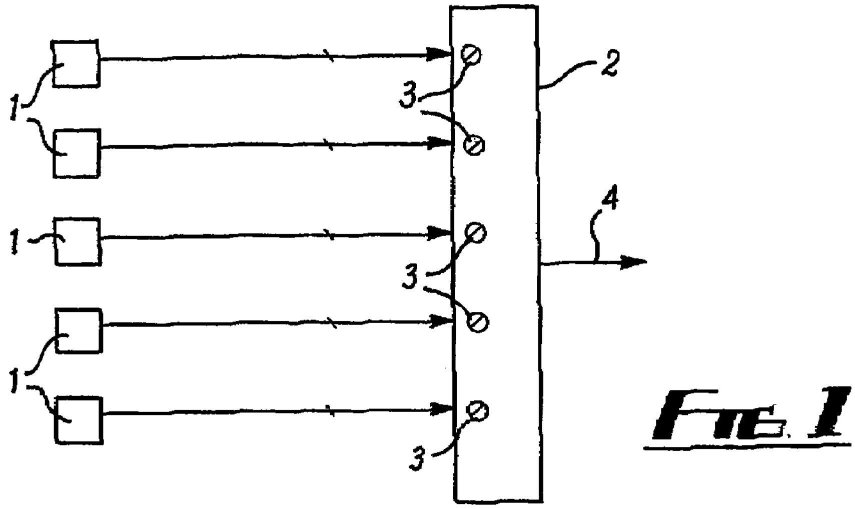
FIG. 1 shows a block circuit diagram of an existing system

Referring to FIG. 1, a conventional audio distribution system is shown. In such a system a plurality of audio inputs 1 are connected in parallel to a mixer 2. In the mixer, the audio inputs are continued at various selected levels using respective volume controls 3 to give a composite output signal 4 which may be fed to an amplifier (not shown) and from there to output devices (not shown) such as loudspeakers as described in the introductory part of the specification.

Figure 2:
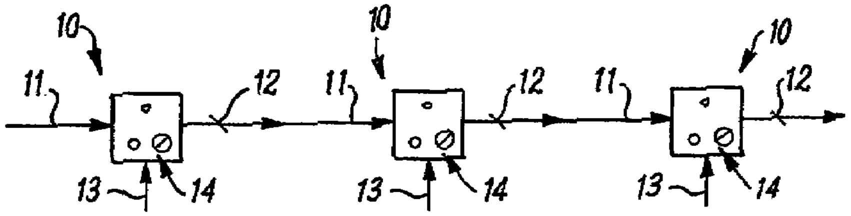
FIG. 2 shows a block circuit diagram of a system according to the invention and FIG. 3 shows part of the circuit diagram of FIG. 2 in greater detail.

Referring to FIG. 2 an audio distribution system according to the invention is shown. This comprises a plurality of individual signal conditioning circuits 10 connected in series by means of a two pair screened audio cable and distributed around a building. Each circuit 10 receives a balanced line level input 11 and delivers a balanced line level output 12 along the audio cable. Each circuit 10 also receives an audio input 13 and comprises control means 14. The output from the final circuit 10 in the series is fed to an audio amplifier (not shown).

Figure 3:
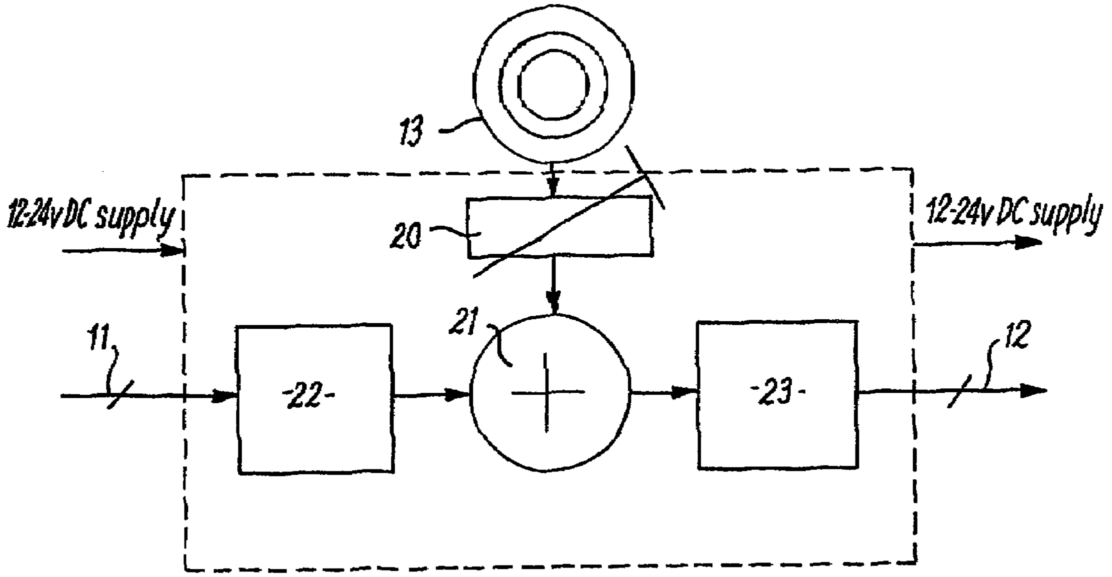

A representative signal conditioning circuit is shown in more detail in FIG. 3. This comprises a signal conditioning unit 20 to which the audio input 13 is fed. The output from the conditioning unit is fed to a precision signal addition device 21. The balanced line level input 11 is fed to a balanced to unbalanced precision signal converter 22. A 12 to 24 volt IDC power supply is fed to the circuit. A similar two pair screened audio cable provides a balanced line level output signal at 12. The output from the balanced to unbalanced precision signal converter 22 is fed to the precision signal addition device 21. The output from the precision addition device is fed to an unbalanced to balanced converter 23 which provides at its output the balanced line level signal at 12. Each balanced line level input and output comprises two opposed signals of equal magnitude on individual wires of a given pair thus reducing electromagnetic interference. The balanced input signal must be converted to unbalanced form to enable the audio input signal to be mixed with or added to it in the precision addition device 21 and then re-converted to balanced form for presentation at the output. The other pair of the two pair cable carries the earth (ground) and 12-24 volt power supply. The audio input 13 performs the basic functionality of each particular signal conditioning circuit. This input 13 may be modified by virtue of audio controls such as tone, volume, on/off, attenuation, spectral manipulation The precision addition device 21 operates to combine and convert the inputs to it to a composite audio signal and then rebalance that signal producing minimal attenuation/distortion and introduction of noise. Each conditioning circuit is mounted on a standard sized electrical plate (single or double gang) and there are many different types of plate each performing a particular function or having a particular connection system for a particular purpose. Extra units may be added as required situated around the building to suit the positioning of the audio sources and types. The units are cascaded each one to the next so as to eventually give only one balanced line level input to the amplification equipment thus eliminating any mixing and control at or near to the amplifier. A conventional mixer is not now required. This type of system lends itself to for example loop amplification systems such as Audio Frequency Inductions Loop Systems (AFILS systems) in which many microphones may be required and spatially distributed (for example conference table) together with inputs from the local public address (PA) system. Power for the system is provided down a separate pair of wires at 12-24v DC from the amplifier auxiliary supply terminals if available or a separate Power Supply Unit (FISU) as preferred. The power is shown being supplied externally but it may be internal or run from different voltages. This is not a critical function.

A system enhancement could be to route the power as composite on the audio cable thus saving wiring. This is feasible but will add more complexity (unnecessarily) to the device.

The more detailed arrangement leads to a number of advantages as compared with prior art arrangements of the sort shown in FIG. 1.

Only the correct number of inputs are provided which reduces cost. One cable can be used to loop through one circuit to the next instead of every input being required to go back to a central point as in FIG. 1 which again reduces cost. Because the audio source is near to the unit susceptibility to electromagnetic interference is reduced as cable length to the unit will be small. Any long cable runs are via a balanced line level feed to the next unit. This gives high common mode rejection coupled with a 0 dbr signal level (relatively high compared to the −50 dbr signal level from the output of say a microphone). All signals are conditioned locally to give an audio standard balanced line level input to the final piece of equipment, for example, an amplifier. All the circuits are basically similar in function with only the individual signal conditioning units and input connection systems being different to suit each particular input application, which reduces costs. The circuits are simple and easy to fit. Local control of the individual audio inputs is provided at each audio input point instead of being sited locally at one mixer.

Because there may be many cascaded units, the electrical noise being generated at each circuit will be additive. For example a S/N ration of 70 db is normally acceptable for microphone preamplifiers on paging quality systems. Once the S/N ration falls below say 50 db then electrical noise becomes significant and normally unacceptable. If the insertion effect of adding another audio input unit was the introduction of another noise source at 70 db S/N ration then clearly adding in say 10 units would decrease the S/N ratio by an order of magnitude that is reduce it by 20 db to 50 db. It is therefore preferable that the effect of insertion of the serially transmitted composite audio signal is very much greater than 70 db and an order of magnitude is desirable that is >90 db. In the preferred embodiment the S/N ratio is >95 db.

Another problem is that of attenuation or amplification of the input balanced line level signal prior to its output caused by the internal signal conditioning. If many units are cascaded in series with only a small amount of for example amplification of say 5% (0.4 db) then after say 10 units the amplification becomes 1.6 times (+4 db) the original signal. This would be unacceptable. It is therefore preferred especially when many units are cascaded to match the amplitude of the balanced input to the output to within 1% of each other (approx 0.1 db). In the preferred embodiment the insertion loss/gain is within 0.05 db.

A third problem is harmonic distortion (non-linearity type distortion) which coupled with noise forms another source of interference to the signal. Again this is compounded by having many stages in series. Therefore it is preferred that the insertion effect of another unit has a very small effect on (THD TOTAL HARMONIC DISTORTION+Noise). THD+Noise of 1% is normally tolerable but again because of the cascaded nature of the system should be at least an order of magnitude less that this on an individual unit basis. In the preferred embodiment the THD+Noise is <0.01% change to the through signal.

It will be appreciated that the above embodiment has been described by way of example only and that many variations are possible without departing from the scope of the invention.

A device may be provided to accept balanced or unbalanced microphone level signals (<−40 db signals) that require the provision or not of a 'phantom' (dc bias) supply to the microphone line. This device then contains a pre-amplifier to take the signal up to line level ready for mixing. A device with in built microphone capsule for direct mounting to a surface for example may be provided. A dual input device to accept and combine a stereo input with a mono signal prior to conditioning. A device to accept any of the above with a switch mechanism to switch on/off either the individual input or the input through line level feed, may be used as a paging type microphone input.

The invention claimed is:

1. An audio distribution system comprising:

a plurality of individual signal conditioning circuits each having a balanced line level input signal and a balanced line level output signal;

means for spatially distributing the plurality of individual signal conditioning circuits in series along an audio cable so that for all of the plurality of individual signal conditioning circuits the balanced line level output signal of one of the plurality of individual signal conditioning circuits couples to a balanced line level input signal of the next downstream one of said plurality of individual signal conditioning circuits;

and means defining a plurality of separate audio input control signals each for directly controlling a respective one of said signal conditioning circuits;

each of said spatially distributed individual signal conditioning circuits including;

a balanced to unbalanced signal converter coupled from said balanced line level input signal and for converting the balanced input signal to an interim unbalanced signal, a signal addition device coupled from said balanced to unbalanced signal converter for mixing the interim unbalanced signal with a respective audio input control signal to provide a composite signal, and an unbalanced to balanced signal converter coupled from said signal addition device for receiving the composite signal and providing a balanced line level output signal.

2. An audio distribution system as claimed in claim 1, in which the balanced to unbalanced signal converter comprises a balanced to unbalanced precision converter.

3. An audio distribution system as claimed in claim 1, in which the signal addition means comprises a precision signal addition device.

4. An audio distribution system as claimed in claim 3, in which the precision signal addition device is connected to the output from the balanced to unbalanced precision signal converter.

5. An audio distribution system as claimed in claim 1, in which the unbalanced to balanced signal convener comprises an unbalanced to balanced precision signal convener.

6. An audio distribution system as claimed in claim 1, in which each of the spatially distributed individual signal conditioning circuits comprises one or more audio controls.

7. An audio distribution system as claimed in claim 1, further including a power supply for the system.

8. An audio distribution system as claimed in claim 1, wherein said plurality of signal conditioning circuits comprises at least three circuits.

9. An audio distribution system as claimed in claim 1 including a signal conditioning unit associated with each signal conditioning circuit and each for receiving the audio input control signal and coupling to the signal addition device.

10. An audio distribution system as claimed in claim 1 wherein each balanced line level signal comprises two signals, the difference of which comprises a signal it is desired to distribute.

* * * * *